Jan. 18, 1927. 1,614,841
F. KRUCKENBERG ET AL
BRAKING ARRANGEMENT FOR HIGH SPEED SUSPENSION RAILWAY
Original Filed Jan. 24, 1925   2 Sheets-Sheet 1
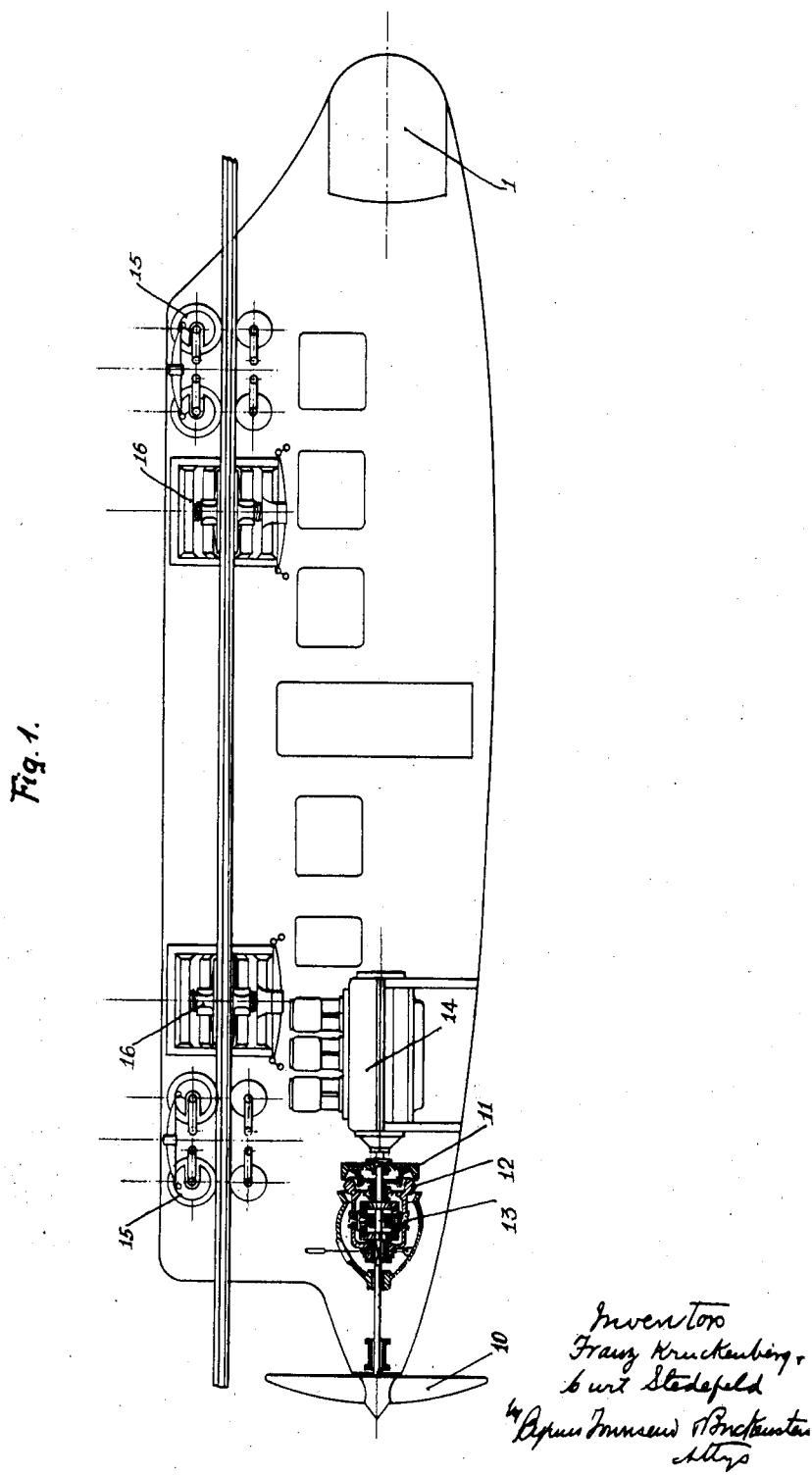

Jan. 18, 1927.                                                           1,614,841
                         F. KRUCKENBERG ET AL
          BRAKING ARRANGEMENT FOR HIGH SPEED SUSPENSION RAILWAY
                  Original Filed Jan. 24, 1925    2 Sheets-Sheet 2
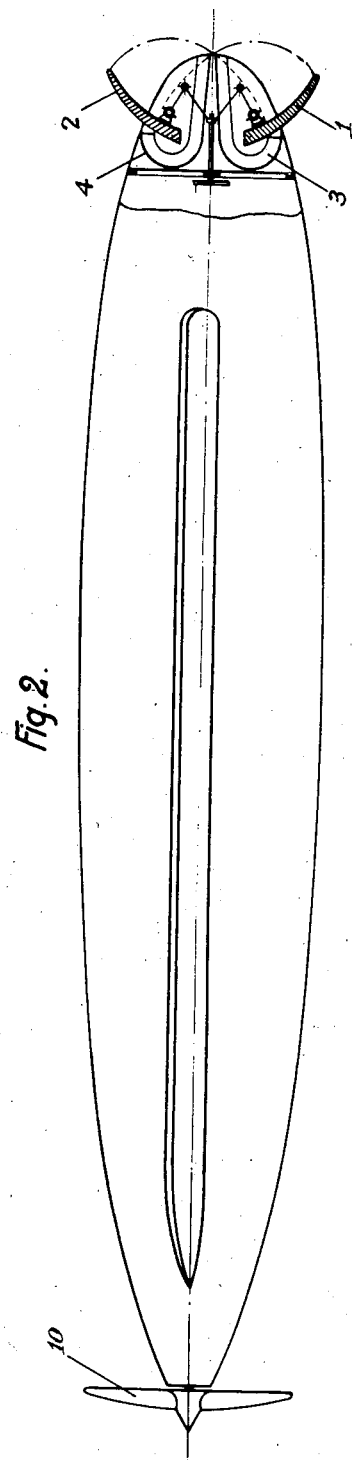
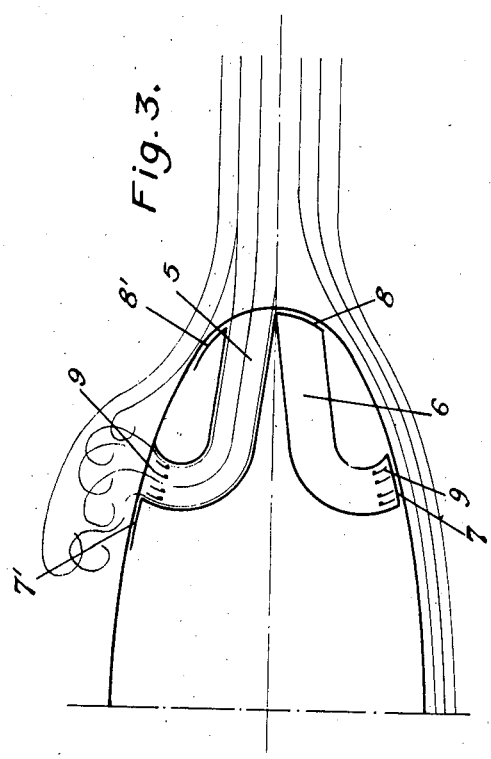
Inventors
Franz Kruckenberg
Curt Stedefeld
by Byrnes Townsend Bricktenstein
Attys

Patented Jan. 18, 1927.

1,614,841

UNITED STATES PATENT OFFICE.

FRANZ KRUCKENBERG AND CURT STEDEFELD, OF HEIDELBERG, GERMANY; SAID STEDEFELD ASSIGNOR TO SAID KRUCKENBERG.

BRAKING ARRANGEMENT FOR HIGH-SPEED SUSPENSION RAILWAY.

Original application filed January 24, 1925, Serial No. 4,574, and in Germany July 2, 1924. Divided and this application filed May 14, 1926. Serial No. 109,157.

The principal object of this invention is to provide braking arrangements for high speed suspension cars moving with a velocity of 200 to 300 M. P. H. The common railway brake with shoes acting on the tire is therefore inadequate. If the running wheel were braked at full speed in this manner both wheel and rail would be unduly stressed and an undesirable roughening of the surface and unequal wear of both parts would result. Moreover, at the braking surfaces a highly undesirable overheating would take place causing them to wear very rapidly. A simple brake on the running wheel would be insufficient to provide the necessary retardation in an emergency.

For these reasons according to this invention an arrangement is provided combining several braking systems which may be used separately or together at will. At really high speeds it is best to avoid friction between rigid bodies, and to use the air itself as braking medium, in which way the braking energy is instantly dissipated, while at low speeds when airbrakes would be ineffective wheel brakes or finally rail-brakes of a special kind may be employed.

Referring to the drawings:—

Figure 1 is a side elevation, partly in section, of a car fitted with the various braking devices comprised in this invention.

Figure 2 is a plan view of the car and illustrates the details of the air brake structure.

Figure 3 is a modified form of the air brake.

In order to make the matter clear, in Figure 1 of the accompanying drawing, is shown such a high speed suspension car; the car body has a streamline form and is carried by means of two or more running gears, which run on a suspension rail and is driven by an air screw at the rear end. If it is desired to stop the car the air screw is declutched. Then the special new air brakes 1 in the forward part of the car begin to act. They increase the resistance of the car very highly. Meanwhile the air screw 10 is reversed by any suitable or convenient means until the braking must be carried out with greater precision. The final retardation is effected by means of special wheel brakes 15, described in our application Serial No. 4,574, filed January 24, 1925. In the case of failure of these two brakes a special emergency rail brake (described in our application Serial No. 109,558, filed May 14, 1926) is provided, the brake shoes of which act as sledge runners should the running gear fail through an accident.

First considering the special new air brakes, as shown in Figures 1 and 2, air resistance plates 1 and 2 are pivotally secured at the front 4 of the car. These plates are so curved on their outer surface that they conform exactly, with the streamline shape of the car, Figure 1, for here, at this point of high dynamic pressure the details of the shape of the car have the greatest effect on the air resistance. For braking, the plates 1 and 2 (see Figure 2) are swung outwardly from the inner part of the car by means of levers, handwheels or the like. In the first place these plates 1 and 2, in their open position, at high speed, owing to the dynamic pressure in front of them and the turbulence behind, cause a remarkably high braking resistance. In the second place, the braking resistance is increased considerably by the provision of suitably curved inner walls in the hollow space or recess in which the plates are located. These walls 3 and 4 are curved laterally so that the stream of air is ejected along the sides of the car and to a certain extent reversed somewhat similarly to the action of the blades in certain turbines. From the nose of the car, that is from the region of highest dynamic pressure, the air which is further compressed by the open plates 1 and 2 and diverted along the walls 3 and 4 is then allowed to escape at high speed through comparatively small openings behind the brake plates 1 and 2 across the turbulent stream which adheres closely to the car surface and which is consequently widened. The retarding action of the whole arrangement is steadily increased by the billowing effect produced in the air in front of the car and secondly the thickness of the turbulent layer is increased very much by the laterally ejected air stream which has a very great velocity.

The essential structural features which are here described as applied to the nose of the car, because this is the most effective position, can naturally be applied at other positions on the car body.

In the arrangement shown in Figure 3 of the accompanying drawings the braking effect is produced solely by the channel without the assistance of any brake plates, which in some cases might increase the car clearance to a prohibitive extent. For this purpose two channels 5 and 6 are provided, which are closed by means of plates or doors 7 and 8 having outer surfaces which conform exactly with the outer surface of the streamline car body. If the doors are opened as indicated at 7' and 8', the air streams through the channel 5 and is ejected to the side of the car so that it meets the slipstream at a right angle and creates turbulences which destroy the smooth streamlines.

The effectiveness of these air brakes decreases very rapidly with the speed of the car, for example by half when the speed has decreased by 29%. An air brake which is effective at all speeds is the reversible propeller 10 Figure 1, but its retarding effect is small. For this reason, as already explained, both methods of air braking are used and means are provided whereby the propeller may be reversed as rapidly as possible. For this purpose an air screw of reversible pitch 10 can be used, or a rapidly reversible motor (reversible electric motors, steam turbines, internal combustion reversed by compressed air or electricity), or a reversing gear on the air screw shaft as shown in Figure 1. The latter is necessary when normal internal combustion engines are employed with fixed blade air screws; it consists of a clutch 11 which is declutched at the commencement of the braking period; and of a brake 12, which serves for stopping the air screw which is running as a windmill, and of a reversing gear 13, which on being engaged reverses the propeller and brakes the car strongly.

The car is stopped by this somewhat complicated arrangement in the following manner: The mechanic simultaneously disengages the clutch 11 between the motor 14 and the propeller 10 and throttles down the motor. The drive is thus disconnected, and the high speed of the car reduced by its own resistance. At the same time the brake plates 1 and 2 at the front of the car are opened which creates a very strong braking effect. The propeller, which now runs as a windmill, is stopped by the brake 12, the reverse 13 is engaged while the throttle is opened. The propeller now runs in the reverse direction adding greatly to the effect of the airbrakes. After a short time the effect of the brake plates 1 and 2 is very much diminished owing to the reduced speed of the car. Now the new type of friction brakes must be used, as stated above. With these the car can be brought to a standstill the propeller having been stopped before entering the station.

For these commonly used friction brakes I prefer the wheel brakes 15 shown in Figure 1. For the reasons already stated, the running wheels are not braked on the periphery as in the ordinary railway but axially from the side. At the same time counter wheels combined with springs of variable tension are employed on the running gear, so that the running wheel is more firmly pressed on the rail and the adhesion and braking effect thereby increased.

This application is a division of our application Serial No. 4,574 filed January 24, 1925.

What we claim is:

1. A braking arrangement for high speed suspension railway cars of stream-line shape, comprising in combination with the car body, a reversible air propeller, means for increasing the air resistance of the car body, friction brakes for the suspension wheels, and rail brakes.

2. A braking arrangement for high speed suspension railway cars of stream-line shape, comprising in combination with the car body, a reversible air propeller, means for increasing the turbulence of the air currents adjacent the car body, friction brakes for the suspension wheels, and rail brakes.

3. A method of braking suspension cars traveling at high rates of speed, which comprises effecting the initial retardation of the car speed by increasing the air resistance of the car body, and finally completely stopping the car by frictional braking means cooperatively related to the car rails.

4. A method for braking suspension cars traveling at high rates of speed, which comprises effecting the initial retardation of the car speed by altering the contours of the car body so as to increase the air resistance and by rotating an air propeller whereby a retarding pull is exerted, and finally completely stopping the car by means of friction brakes on the suspension wheels.

5. A braking arrangement for high speed suspension railway cars of stream-line shape, comprising in combination with the car body, a reversible air propeller, means for altering the stream-line contour of the car body whereby the air resistance thereof is increased, friction brakes for the suspension wheels, and rail brakes.

6. A braking arrangement for high speed suspension railway cars of stream-line shape, comprising in combination with the car body, a reversible air propeller, means for increasing the air resistance of the car by altering the stream-line contour of the car body, said means forming in the normal running position an integral part of the stream-line body, friction brakes for the suspension wheels, and rail brakes.

7. A braking arrangement for high speed suspension railway cars of stream-line shape, comprising in combination with the car body, means for altering the stream-line contour of the car body whereby the air resistance thereof is increased, friction brakes for the suspension wheels, and rail brakes.

8. A braking arrangement for high speed suspension railway cars of stream-line shape, comprising in combination with the car body, means for increasing the air resistance of the car by altering the stream-line contour of the car body, said means forming in the normal running position an integral part of the stream-line body, friction brakes for the suspension wheels, and rail brakes.

9. A high speed suspension car of stream-line shape, the body of said car having recesses provided in the forward end, the walls of said recesses being constructed so as to present highly air resistant surfaces, pivotally mounted closures for said recesses, whereby the stream-line shape of the car may be altered and the air resistance thereof increased.

10. A high speed suspension car of stream-line shape, the body of said car having recesses provided in the forward end, the walls of said recesses being constructed so as to present highly air resistant surfaces, pivotally mounted closures for said recesses, said closures constituting in the open position air vanes, whereby the turbulence of the air currents adjacent the car body and the air resistance thereof may be increased.

11. A high speed suspension car of stream-line shape, the body of said car having recesses provided therein, the walls of said recesses being constructed so as to present highly air resistant surfaces, closures for said recesses, whereby the stream-line shape of the car may be altered and the air resistance thereof increased.

12. A high speed suspension car of stream-line shape, the body of said car having recesses provided therein, the walls of said recesses being constructed so as to present highly air resistant surfaces, closures for said recesses, said closures constituting in the open position air vanes, whereby the stream-line shape of the car may be altered and the air resistance thereof increased.

13. The combination in a braking device for a high speed suspension car, the body of said car having a curved passageway arranged therein, of means for opening and closing the inlet to said passageway, the inlet and outlet to the passageway being located so that a current of air passed therethrough is ejected at the sides of the car so that the turbulence of the air currents adjacent the car is considerably increased.

14. The combination in a braking device for a high speed suspension car, the body of said car having a curved passageway arranged within the forward portion, of means for opening and closing the entrance to the passageway, said passageway being arranged so that the direction of flow of an air stream passed therethrough is partially reversed, said air stream then being ejected at the sides of the car in a generally forward direction along a line forming an acute angle with the longitudinal axis of the car.

15. In combination in a braking device for a high speed suspension car, the body of said car having a curved passageway arranged within the forward portion, said passageway being arranged so that a stream of air passed therethrough is ejected at the sides of the car and considerably increases the turbulence of the air currents adjacent the car, means for opening and closing the entrance of the passageway, said means constituting in the closed position an integral part of the stream-line structure of the car body, and in the open position air vanes whereby the air resistance of the car is increased.

In testimony whereof we affix our signatures.

FRANZ KRUCKENBERG.
CURT STEDEFELD.